Figure 1:
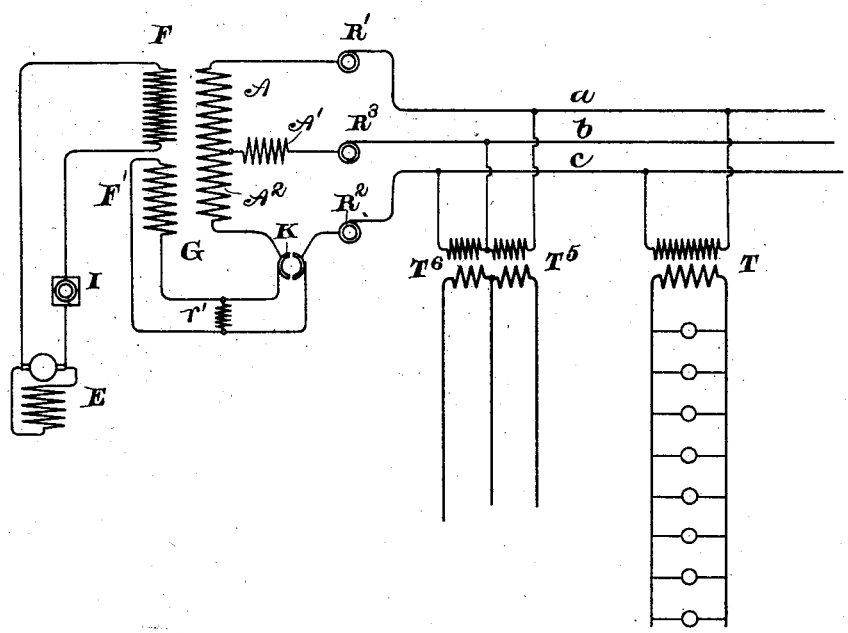

(No Model.) 2 Sheets—Sheet 1.

C. P. STEINMETZ.
SYSTEM OF DISTRIBUTION BY ALTERNATING CURRENTS.

No. 533,244. Patented Jan. 29, 1895.

WITNESSES.
A. F. Macdonald.
B. B. Hill.

INVENTOR.
Charles P. Steinmetz
By Geo. R. Blodgett
Atty.

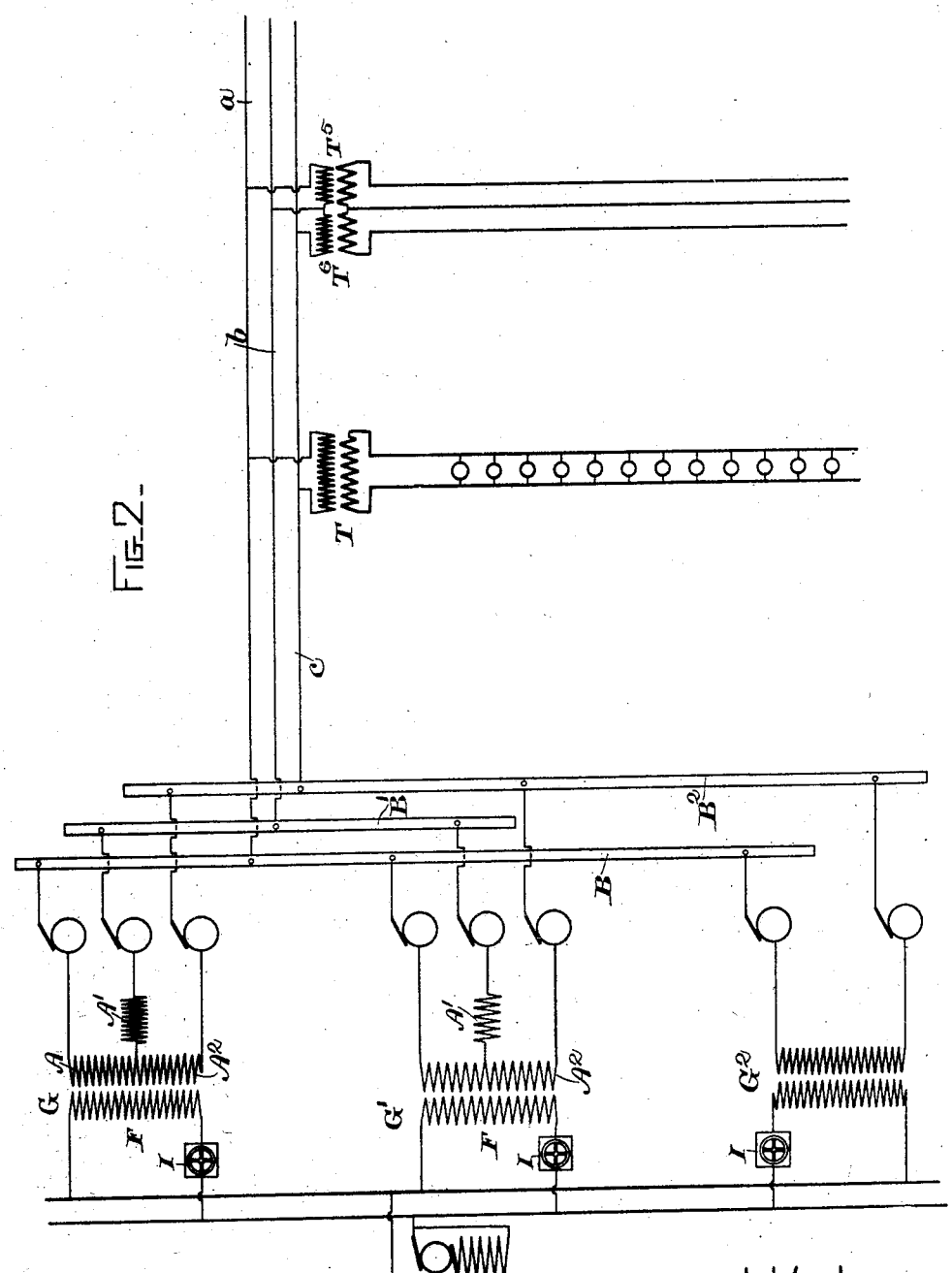

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF DISTRIBUTION BY ALTERNATING CURRENTS.

SPECIFICATION forming part of Letters Patent No. 533,244, dated January 29, 1895.

Application filed April 2, 1894. Serial No. 505,987. (No model.)

*To all whom it may concern:*

Be it known that I, CHARLES P. STEINMETZ, a subject of the Emperor of Germany, residing in the city and county of Schenectady, State of New York, have invented certain new and useful Improvements in Systems of Distribution by Alternating Currents, of which the following is a specification.

The present invention comprises what I term a monocyclic system of distribution, and consists of certain improvements whereby lamps or other single-phase translating devices, as well as multiphase motors, may be supplied with current from a single source of power and a common system of circuits. The system resembles in some respects the ordinary alternating single-phase distribution systems such as are now used extensively for lighting purposes, but by the present invention I render such a system capable of operating multiphase motors as well as lamps when desired without the necessity of installing special multiphase generators for the motors or running special circuits. In fact, by the present invention the generators employed may be installed for an ordinary lighting system, and whenever it is desired to operate motors as well as lamps it is only necessary to run an additional main to the point or points where the motors are located and to maintain upon this main an out-of-phase electromotive force, so that between this main and the single phase mains polyphase electromotive forces will exist. This end is attained through the agency of a supplementary or phase-modifying source of electromotive force so arranged as to act jointly with the main source of electromotive force but having a different phase relation, so that by the combined action of the main and supplementary sources an electromotive force of displaced phase is maintained upon the third or intermediate main of the polyphase circuit. There is a wide variety of ways in which this combination of electromotive forces may be secured in practice, some of which will be specifically described in other applications.

The general method herein set out consists in the use of a phase-modifying coil on the main generator which is of the ordinary single phase type, this supplementary coil having a displaced position from the main winding in the field of force so as to tend to generate an electromotive force of different phase from that generated in the main winding. This coil is connected at one end to an intermediate point in the main winding and at the other end to the intermediate main of a polyphase circuit, the outside mains of the circuit being connected to the terminals of the main winding. By this arrangement an alternating electromotive force is maintained between the two outside mains by the main winding of the generator while resultant electromotive forces are maintained between the intermediate main and the outside mains respectively, which are due to the joint action of the main winding and phase-modifying coil and which are out of phase with one another and with the electromotive force existing between the outside mains.

Figure 3:
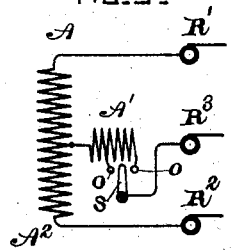
Figure 4:
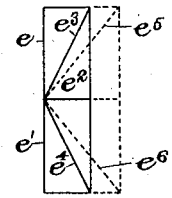

In the accompanying drawings illustrating the invention, Figure 1 shows a distribution system in diagram. Fig. 2 shows in a similar manner a distribution system comprising a bank of dynamos in which monocyclic machines are working in multiple with ordinary single-phase machines. Fig. 3 is a diagram showing means of regulating the phase-modifying coil of the generator. Fig. 4 is a geometrical diagram illustrating the relation between displacement of phase and the relative values of the component electro-motive forces.

In Fig. 1 the generator comprises an armature winding A A², whose terminals are connected to collector rings R' R² and which is arranged in a manner similar to ordinary single-phase alternating dynamos. The winding A A² constitutes the main source of electromotive force and maintains alternating electromotive force waves in the mains $a$ $c$ connected respectively to the collector rings and which constitute either a single-phase circuit or the outside mains of a polyphase circuit. The field of the generator is wound with a coil F in circuit with a separate shunt-wound exciting dynamo E, and a resistance I is provided for regulating the exciter. For compounding or over-compounding the main dynamo, its field may also be provided with a series coil F', the current in which is rectified by a commutator K, and a resistance $r'$ is shown shunting the commutator brushes to prevent sparking; though this forms no part of the invention. The intermediate main $b$ of the multiphase circuit is connected to a third collector ring $R^3$, and the phase-modifying coil $A'$ which occupies a displaced position in the field of force has one terminal connected to this collector ring and its other terminal to a point at or near the electrical center of the main winding as shown in the diagram. When single-phase translating devices alone are used the phase-modifying coil will be open circuited, and at such times the system will operate in all respects as any ordinary alternating system, the single-phase translating devices, such as lamps, being connected electrically or inductively with the outside mains $a$ $c$, and the intermediate main being dead. When polyphase currents are desired the phase-modifying coil is connected to the intermediate main, and electromotive forces are then maintained between this main and the mains $a$ $c$ respectively, due to the resultant action of the coil $A'$ and the halves of the main winding $A$ $A^2$, which are out of phase with one another and with that maintained by the unmodified action of the main winding between the mains $a$ $c$. When now translating devices are connected with the three mains, polyphase currents are obtainable having a phase relation determined by the resultant action of the main and supplementary sources of electromotive force.

In the diagram, Fig. 1, a circuit of lamps which require only single-phase currents, is shown connected inductively through the transformer $T$ with the mains $a$ $c$. At the right of the figure a system of transformers is shown, suitable for transforming multiphase currents derived from the three mains. Two transformers, $T^5$ and $T^6$ are used whose primaries are connected in series and whose free terminals are connected to the mains $a$ $c$, while the intermediate main $b$ is connected to a point between the primaries. The secondaries are similarly connected. Such an arrangement will transform the primary currents into secondary currents of different potential, but having the same phase relation.

In Fig. 2 a bank of generators is shown connected to common bus-bars $B$, $B'$, $B^2$. Two of these generators $G$, $G'$ are of the monocyclic type already described, provided with phase-modifying coils $A'$ connected to an intermediate point in the main coil $A$, $A^2$ and to the bus-bar $B'$. The remaining generator $G^2$ is of the ordinary single-phase type with its terminals connected to the bus-bars $B$, $B^2$. The field coils of the different generators are all excited from a separate direct current machine $E$ and may be independently regulated by rheostats $I$, $I$, $I$. The arrangement of distributing mains $a$ $b$ $c$, of transformers and working circuits is the same as already described. The transformer $T$ is shown connected with the outside mains and feeding a lamp circuit, while transformers $T^5$ $T^6$ are shown connected to the three mains and transforming polyphase currents suitable for motors as well as lamps. The generator $G^2$ supplies current only to the single-phase translating devices, but it works in multiple as shown, with the generators $G$ $G'$ which are the source of polyphase currents.

Referring again to the construction of the generator, the angle of displacement of phase maintained in the main $b$ depends upon the relative values of the component electromotive forces due to the phase-modifying coil and the main coil. These component forces may be illustrated geometrically as in Fig. 5, where $e$ represents, for example, the electromotive force of one half the main winding $A$, $e'$ representing the electromotive force due to the other one half $A^2$ of the winding and $e^2$ the electromotive force due to the phase-modifying coil. The resultant electromotive forces maintained between the main $b$ and the mains $a$ $c$ will then be represented by $e^3$ $e^4$. If now the relative value of the components is changed, as for example, by increasing the value of $e^2$ while maintaining $e$ $e'$ the same as is indicated in dotted lines, the resultant electromotive forces will assume a different angular position, and consequently the difference of phase will be correspondingly changed. To enable the adjustment of the phase relation, I provide means for regulating the value of the component electromotive forces. This may be accomplished in a variety of ways needing no special description, but the simplest and preferred method will be to wind the phase-modifying coil in sections, providing a switch for cutting more or less of them into circuit. This is illustrated in Fig. 3 where a switch $s$ coupled with a collector ring $R^3$ sweeps over contacts $o$, connected at different points to the phase-modifying coil.

In this specification the phase-modifying source of electromotive force is described as consisting of a supplementary coil on the generator. It is however, not necessary that the modifying source of electromotive force be connected with the main source directly. I have shown in other applications different embodiments of the invention in which this modifying source of electromotive force is located at a distant point on the line.

My purpose in this specification is to claim the invention broadly, and also to cover the special forms of the invention which are specifically set forth; while in other applications I will claim other specific forms.

What I claim as new, and desire to secure by Letters Patent of the United States, is—

1. The method of maintaining polyphase electromotive forces in the different mains or branches of a polyphase distribution system, which consists in connecting electrically or inductively two or more of such mains to the terminals of a main source of electromotive force of the single-phase type, and similarly connecting another of the mains to such source through a supplementary source of electromotive force of different phase relation, whereby such last mentioned source of electromotive force gives rise to a desired difference of phase between the mains, as described.

2. The method of maintaining polyphase electromotive forces in the different mains or branches of a polyphase distribution system, which consists in inducing alternating electromotive forces in a stationary or moving electro-dynamic mechanism of the single-phase type, to whose terminals some of the mains are electrically or inductively connected, and inducing an electromotive force of different phase relation in a supplementary conductor connected to one or more other mains, which acting to modify the first named electromotive force, creates the desired difference of phase between the mains, as set forth.

3. The method herein set forth, which consists in maintaining polyphase electromotive forces between the different branches of a polyphase distribution system by the combined action of a source of electromotive force of the single-phase type, and a modifying source of electromotive force of different phase relation, and adjusting the difference of phase by regulating the relative values of the main and modifying electromotive forces, as described.

4. The method herein set forth, which consists in maintaining between two branches or mains of a polyphase distribution system, an alternating electromotive force by connecting them inductively or electrically with any ordinary source of electromotive force of the single-phase type, and maintaining between such mains and an additional main electromotive forces out of phase with one another and with that between the first named mains, which electromotive forces are the resultants of the main source and a supplementary source of electromotive force of different phase relation.

5. The herein described method, which consists in connecting a modifying source of electromotive force to a point at or near the electrical center of a main source of electromotive force of the single-phase type, the modifying electromotive force having a different phase relation, and by its modifying influence creating a desired difference of phase between the terminals of the main source and the free terminal of the auxiliary source, as described.

6. The method herein set forth, which consists in maintaining an alternating electromotive force between two branches or mains of an electric distribution system connected respectively to the terminals of a main generator of electromotive force of the single-phase type, and, for the purpose of securing multiphase currents when desired, maintaining on a separate branch or branches of the systems an electromotive force of displaced phase by the combined action of the said main source of electromotive force and a supplementary source of electromotive force having a different phase relation, and thereby modifying to the desired extent the phase relation of the resultant electromotive force.

7. The combination of a generator or source of electromotive force of the single-phase type and an electric circuit connected electrically or inductively therewith, with a separate main or mains forming with the said circuit a multiphase distribution system, and a supplementary or modifying source of electromotive force in circuit with such last named main or mains tending to generate an electromotive force of different phase from the main source, and thereby maintaining a displacement of phase between the different mains suitable for the derivation of polyphase currents, as described.

8. The combination of a main source of electromotive force of the alternating single-phase type having its poles connected to mains forming part of an electric distribution system, and a supplementary source of electromotive force of different phase relation connected to an additional branch of the system, and serving jointly with the main generating source to maintain a resultant electromotive force on the main to which it is connected, having a desired difference of phase from that developed by the unmodified action of the main source.

9. The combination of a main source of electromotive force of the single-phase type connected to some of the mains of a distribution system, and a modifying source of electromotive force of different phase relation between such main source and one or more other mains of the system, as set forth.

10. The combination of main and modifying sources of electromotive force of different phase relation connected to, and maintaining polyphase electromotive forces in, the different branches of a polyphase distribution system, as described, with lamps or other single phase translating devices supplied with current by the mains connected with the main source of electromotive force, and polyphase motors or other like devices supplied with current from the mains connected with both sources of electromotive force, as described.

11. A dynamo electric machine having a main armature winding of the single-phase type, and a phase-modifying coil connected to an intermediate point in the main winding and occupying a displaced position in the field of force, as set forth.

12. A dynamo-electric machine having a main armature winding of the single-phase type connected at its respective ends to collector rings or similar circuit terminals, and a phase-modifying coil connected at one end to a point at or near the electrical center of the main winding and at the other end to a collector ring, as described.

13. The combination of a plurality of alternating current dynamo electric machines coupled in multiple, one or more of such machines being provided with a supplementary winding serving as a source of electromotive force of displaced phase with single phase circuits extending from all the machines and multiphase circuits extending from the machine or machines provided with the supplementary winding.

14. In a system of electric distribution, a main source of alternating electro-motive-force connected to two of the mains of said system, means for regulating the said source in correspondence with demands on said mains, and a supplementary source of alternating electro-motive-force of different phase relation connected to an additional main and serving jointly with the main generating source to maintain a resultant electro-motive-force on the main to which it is connected, having a desired difference of phase from that developed by the unmodified action of the main source.

15. The combination of main and modifying sources of electro-motive-force of different phase relation, connected to and maintaining polyphase electro-motive-forces in the different branches of a polyphase distribution system, with lamps or other single phase translating devices supplied with current by the mains connected with the main source of electro-motive-force, polyphase motors or other like devices supplied with current from the mains connected to both sources of electro-motive-force, and means for regulating the main source of electro-motive-force in correspondence with the demands of said single phase translating devices.

16. The combination of a main source of electro-motive-force of the alternating single phase type having its poles connected to mains forming part of an electric distribution system, means for regulating the said main source in correspondence with the demands on said mains, and a supplementary source of electro motive-force of different phase relation connected to an additional branch of the system, and serving jointly with the main generating source to maintain a resultant electro-motive-force on the main to which it is connected, having a desired difference of phase from that developed by the unmodified action of the main source.

In witness whereof I have hereunto set my hand, at Schenectady, New York, this 31st day of March, 1894.

CHARLES P. STEINMETZ.

Witnesses:
A. H. ARMSTRONG.
ERNST BERG.